United States Patent [19]

Mallozzi et al.

[11] Patent Number: 4,962,459

[45] Date of Patent: Oct. 9, 1990

[54] SYSTEM FOR ACCOUNTING FOR POSTAGE EXPENDED BY A POSTAGE METER HAVING DATA SECURITY DURING PRINTING

[76] Inventors: Joseph D. Mallozzi, 112 Teeter Rock St., Trumbull, Conn. 06611; Neale C. Hutcheson, 205 Park St., New Canaan, Conn. 06840; Michelle S. Breault, 199 Osborne Hill Rd., Fairfield, Conn. 06430; Edward P. Daniels, 350 Stonehouse Rd., Trumbull, Conn. 06611

[21] Appl. No.: 813,458

[22] Filed: Dec. 26, 1985

[51] Int. Cl.⁵ .............................................. G06F 15/20
[52] U.S. Cl. ................................. 364/464.02; 364/401
[58] Field of Search ................ 364/200, 900, 401–406, 364/464, 466; 235/375, 378, 379

[56] References Cited

U.S. PATENT DOCUMENTS

| Re. 31,875 | 4/1985 | Check, Jr. et al. | 364/900 |
|---|---|---|---|
| 4,097,923 | 6/1978 | Eckert, Jr. et al. | 364/900 |
| 4,222,518 | 9/1980 | Simjian | 235/375 |
| 4,271,481 | 6/1981 | Check, Jr. et al. | 364/900 |
| 4,286,325 | 8/1981 | Dlugos et al. | 364/466 |
| 4,319,328 | 3/1982 | Eggert | 364/466 |
| 4,339,807 | 7/1982 | Uchimura et al. | 364/900 |
| 4,390,952 | 6/1983 | Dlugos | 364/900 X |
| 4,442,345 | 4/1984 | Mollier et al. | 235/375 X |
| 4,511,793 | 4/1985 | Racanelli | 235/462 |
| 4,525,786 | 6/1985 | Crowley et al. | 364/466 |
| 4,577,283 | 3/1986 | Soderberg et al. | 364/466 X |
| 4,633,397 | 12/1986 | Macco | 364/401 X |
| 4,638,439 | 1/1987 | Daniels | 364/466 |

FOREIGN PATENT DOCUMENTS

3031432 3/1981 Fed. Rep. of Germany .
3416590 11/1984 Fed. Rep. of Germany .

Primary Examiner—Parshotam S. Lall
Assistant Examiner—Joseph L. Dixon
Attorney, Agent, or Firm—Robert H. Whisker; Melvin J. Scolnick; David E. Pitchenik

[57] ABSTRACT

A system for accounting for postage expended by a postage meter. The system includes a keyboard and display for entry of commands and postal information, a printer, a memory for storing account records and program data, the memory further including a non-volatile memory for storing account records and other data, an interface to an electronic postage meter, and a processor including a CPU. The processor controls an electronic postage meter through the interface in accordance with the program data and entered postal information to set the meter and then responds to signals from the meter to update account records. The processor may also edit selected account records in accordance with entered information. In one disclosed embodiment the system responds to an operator request to print the account data base by repetitively scanning the account data base and sequentially printing accounts. In another disclosed embodiment the system stores images of accounts to be edited in selected regions of non-volatile memory before beginning to edit the account. These embodiments increase the security of the data in the accounts by avoiding exposure to data loss due to power failures or transients while accounts are being processed. In another disclosed embodiment a record of edited accounts is maintained by the system to allow a service technician to detect unauthorized editing of accounts. In still another disclosed embodiment the system tracks the contents of the postage meter ascending register to detect off-line meter usage.

15 Claims, 12 Drawing Sheets

```
┌─────────────────────────────────────┐       ┌─────────────────────────────────────┐
│ ------- REPORT 5 -------            │       │ ------- REPORT 5 -------            │
│ ------- ACCOUNT EDIT -------        │       │ ------- ACCOUNT EDIT -------        │
│ STATION ID: 10    TIME: 11:23       │       │ STATION ID: 10    TIME: 11:23       │
│ DATE: 07-15-84                      │       │ DATE: 07-15-84                      │
│                                     │       │                                     │
│ ACCOUNT# CLASS  PIECES   $ VALUE    │       │ ACCOUNT# CLASS  PIECES   $ VALUE    │
│   1234   1 FIRST                    │       │   1234   1 FIRST                    │
│ PREVIOUS TOTAL   17463    1263.01   │       │ PREVIOUS TOTAL   17463    1263.01   │
│ CHANGE        -     59  - $   9.67  │       │ CHANGE        -     59  - $   9.67  │
│ NEW TOTAL        17584  $ 1253.34   │       │ NEW TOTAL        17584  $ 1253.34   │
│                                     │       │                                     │
│   1235   1 FIRST                    │       │   1234   1 FIRST                    │
│ PREVIOUS TOTAL   25631     571.06   │       │ PREVIOUS TOTAL   25631     571.06   │
│ CHANGE        +     59  + $   9.67  │       │ CHANGE        +     59  + $   9.67  │
│ NEW TOTAL        25690  $  580.73   │       │ NEW TOTAL        25690  $  580.73   │
│                                     │       │                                     │
│            CONFIRMED                │       │      PREVIOUS TOTALS UNCHANGED      │
└─────────────────────────────────────┘       └─────────────────────────────────────┘
           ⏟5              ⏟5a                         ⏟5              ⏟5b

┌─────────────────────────────────────┐       ┌─────────────────────────────────────┐
│ ------- REPORT 4 -------            │       │ ------- REPORT 4 -------            │
│ ------- ACCOUNT EDIT -------        │       │ ------- ACCOUNT EDIT -------        │
│ STATION ID: 10    TIME: 11:23       │       │ STATION ID: 10    TIME: 11:23       │
│ DATE: 07-15-84                      │       │ DATE: 07-15-84                      │
│                                     │       │                                     │
│ ACCOUNT# CLASS  PIECES   $ VALUE    │       │ ACCOUNT# CLASS  PIECES   $ VALUE    │
│   1234   1 FIRST                    │       │   1234   1 FIRST                    │
│ PREVIOUS TOTAL   17463    1263.01   │       │ PREVIOUS TOTAL   17463    1263.01   │
│ CHANGE        -     59  - $   9.67  │       │ CHANGE        -     59  - $   9.67  │
│ NEW TOTAL        17584  $ 1253.34   │       │ NEW TOTAL        17584  $ 1253.34   │
│                                     │       │                                     │
│            CONFIRMED                │       │      PREVIOUS TOTAL UNCHANGED       │
└─────────────────────────────────────┘       └─────────────────────────────────────┘
           ⏟4              ⏟4a                         ⏟4              ⏟4b
```

```
------ REPORT 6 ------
------ CLEAR ACCOUNT/CLASS ------
STATION ID: 10      TIME: 11:23
DATE: 07-15-84

ACCOUNT#  CLASS    PIECES   $ VALUE
  1234    01 FIRST    34      6.45
          02 SECND    13      3.01
          03 THIRD    59     19.67
          04 EXPRS    60     73.34
  TOTAL . . . . . .  116   $102.47

CONFIRMED
```

```
------ REPORT 6 ------
------ CLEAR ACCOUNT/CLASS ------
STATION ID: 10      TIME: 11:23
DATE: 07-15-84

ACCOUNT#  CLASS    PIECES   $ VALUE
  1234    01 FIRST    34      6.45
          02 SECND    13      3.01
          03 THIRD    59     19.67
          04 EXPRS    60     73.34
  TOTAL . . . . . .  166   $102.47

ABOVE ACCOUNTS UNCHANGED
```

```
------ REPORT 7 ------
------ CLEARED ACCOUNT SUMMARY ------
STATION ID: 62      TIME: 13:34
REPORT PERIOD:
  07-01-84 TO 07-31-84

ACCOUNT#  CLASS    PIECES   $ VALUE
   167    1 FIRST      60     12.00
          2 SECND      12      2.04
          5 INTNL      45     14.85
  TOTAL . . . . . .   117    $28.89

196    1 FIRST     220     44.00
          4 BULK4     796    262.69
          8 UPSON     900    531.00
  TOTAL . . . . . .  1916   $837.69

297    1 FIRST     420     84.00
          4 BULK4     907    299.31
  TOTAL . . . . . .  1327   $383.31

------ STATION TOTAL ------
          CLASS    PIECES   $ VALUE
          1 FIRST     700    140.00
          3 THIRD      12      2.04
          4 BULK4    1703    562.00
          5 INTNL      45     14.95
          8 UPSON     900    541.00
  TOTAL . . . . . .  3360  $1249.00

CONFIRMED
```

```
---------- REPORT 8 ----------
---------- ACCOUNT TOTALS ----------
STATION ID: 62       TIME: 13:34
REPORT PERIOD:
  07-01-84 TO 07-31-84

ACCOUNT#  CLASS     PIECES   $ VALUE
   167    1 FIRST       60     12.00
          2 SECND       12      2.04
          5 INTNL       45     14.85
   TOTAL......         117    $28.89

196    1 FIRST      220     44.00
          4 BULK4      796    262.69
          8 UPSON      900    531.00
   TOTAL......        1916   $837.69

297    1 FIRST      420     84.00
          4 BULK4      907    299.31
   TOTAL......        1327   $383.31

---------- STATION TOTAL ----------
          CLASS     PIECES   $ VALUE
          1 FIRST      700    140.00
          2 THIRD       12      2.04
          4 BULK4     1703    562.00
          5 INTNL       45     14.95
          8 UPSON      900    541.00
   TOTAL . .         3360  $1249.00
```

```
---------- REPORT 9 ----------
---------- ACCOUNT TOTALS ----------
STATION ID: 101      TIME: 12:34
REPORTING PERIOD:
  07-01-84 TO 07-31-84

ACCOUNT#           PIECES   $ VALUE
   167                117     28.89
   196               1916    837.69
   297               1327    383.31
   TOTAL....        4738   $8332.70

---------- ACCOUNT SUMMARY ----------
STATION ID: 10       TIME: 11:23
DATE: 07-15-84

ACCOUNT#  CLASS     PIECES   $ VALUE
   167    1 FIRST       60     12.00
          3 THIRD       12      2.04
          5 INTNL       45     14.85
   TOTAL......         117    $28.89

---------- REPORT 13 ----------
---------- ACCOUNT SUMMARY ----------
STATION ID: 101      TIME: 11:23
DATE: 07-15-84

ACCOUNT#           PIECES   $ VALUE
   167                117     28.89
```

SYSTEM FOR ACCOUNTING FOR POSTAGE EXPENDED BY A POSTAGE METER HAVING DATA SECURITY DURING PRINTING

BACKGROUND OF THE INVENTION

Postal rates have been steadily increasing for the past several years and postage costs have become a greater and greater burden for mailers. To help in controlling postage costs, mailers, particularly larger mailers, have a need for a means to account for postage expended on a departmental and/or a customer basis in order to maintain closer control of postage costs and to facilitate charge back of such costs. Such mailers will typically have one or more postage meters. (Postage meters are well-known devices which imprint appropriate postal indicia and account for postage expended up to a pre-set limit.) Given the need to control postage costs through closer departmental or customer accounting and the fact that postage meters only record total postage expended, there is a need for systems to facilitate accounting for the postage expended through a postage meter.

One such system is disclosed in U.S. Pat. No. 4,319,328, For: Postage Cost Recording System, To: Eggert, Issued: Mar. 9, 1982. In the system disclosed, a postage computer sets a mechanical postage meter in accordance with information received from a postal scale and records postage for each item metered in response to a signal from a "item feed sensor". Other such systems include the Electronic Accounting System (EAS) and the Electronic Journal Printer (EJP) marketed by Pitney Bowes Inc. of Stamford, Conn.

It will be apparent to those skilled in the art that an important feature of such systems is data security. Clearly such systems will fail of their object if data may be lost or altered by power failure or transients, or through inadvertent or fraudulent operation of the system. Heretofore, such systems have relied upon the use of non-volatile memory to secure data during power failure and on the use of special supervisory access codes for functions such as editing of accounts. One example of a technique for data security is disclosed in U.S. Pat. No. 4,323,987 to Holtz et al. The system taught in this patent includes a back-up battery power supply which is connected to a volatile memory if an impending power failure is detected. The system further includes a timer which measures the duration of the power failure and initiates a transfer of the memory contents to an external device such as a printer for later recovery.

While systems using such techniques have been generally successful, some problems have remained. Despite the use of non-volatile memory power failures or transients which occur at critical times such as during print out of account records or editing of account records, may still result in the loss of account data. Also, it has been found that operators have in practice often obtained the supervisory access code and erroneously edited account records.

Through their experience with such previous systems, Applicants and their co workers have learned that the sensitivity of such systems to power failures or transients when outputting or editing account records arises out of the nature of mailroom operations. When users create accounts, they will, in general, wish to assign identifying account numbers in accordance with their own pre-existing systems. As a result, the account numbers of account records stored in non-volatile memory will, in general, be random with respect to the sequence in which the account records are stored. When these records are printed out, however, the users want the print out to be in account number order for ease of use. As a result in previous systems, it has generally been necessary to sort the data base of the account records before the records are output. As the Applicants have realized, the problem here is that a power failure or transient which occurs at the point where a record has been partially rewritten, may result in the loss of the data in that account. Similarly, when an account is edited, a power failure or transient which occurs when the edited account is only partially updated, will effectively result in the loss of the data in that account since it will in general be difficult or impossible to identify which items in the account have been updated and which have not been updated.

Accordingly, it is an object of the subject invention to provide a system for accounting for postage expended through a postage meter.

More particularly, it is an object of the subject invention to provide such a system which has improved data security in the event of a power failure or transient when account records are being output or edited.

BRIEF SUMMARY OF THE INVENTION

The above objects are achieved and the disadvantages of the prior art are overcome in accordance with the subject invention by means of a system for accounting for postage expended by a postage meter which includes an apparatus for entry of commands and postal information including an account number by an operator, such apparatus typically including a keyboard and display, a printer, a memory for storing program data and account records, the memory further including a non-volatile memory for storing the account records, an interface to an electronic postage meter, and a processor including a CPU connected to the data entry apparatus, the memory, the printer, and the interface. The processor responds to entry of the postal information in accordance with the program data to transmit signals through the interface to set the postage meter, and then responds to a signal specifying the postage expended transmitted back from the postage meter through the interface to update the account record corresponding to the account number specified by the postal information. The processor also responds to entry of a report command to print the account records in account number order on the printer by sequentially scanning all of the account records, printing the account record having the lowest account number which has not previously been printed, storing an indication of the account record printed, and repeating this procedure until all account records are printed.

In another embodiment of the subject invention, the system responds to entry of an edit command to edit account records selected in accordance with information entered by an operator. The processor first sets a flag in the account record to be edited indicating edited status, then creates a second copy of the account record in a pre-selected portion of the non-volatile memory, and then updates the selected record as specified by information entered by an operator.

Thus, it may be seen that the subject invention provides an advantageous way to increase the data security of systems for accounting for postage expended by a postage meter in the event of power failure or transients.

Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

Figure 1:
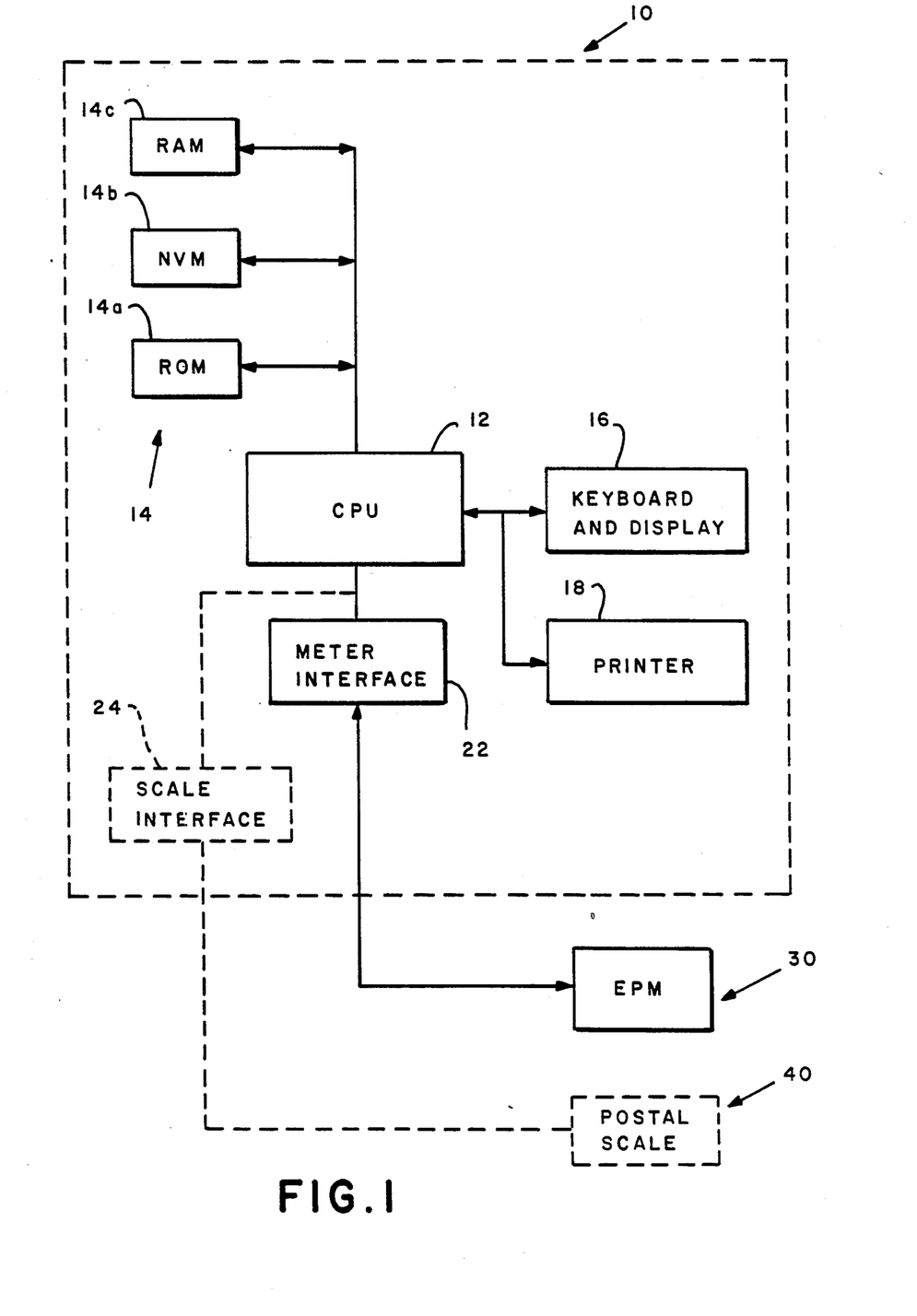
FIG. 1 shows a schematic block diagram of a system in accordance with the subject invention.

FIG. 1 shows a schematic block diagram of an embodiment of the subject invention. Accounting system 10 comprises a CPU 12, which may be an Intel 801 8 bit microprocessor marketed by the Intel Corporation, San Clara, Calif. CPU 12 is connected to memory 14, which includes ROM 14a for storing program data, non-volatile memory 14b for storing account records and other critical data which must be retained when system power is off, and RAM 14c which serves as a working memory for CPU 12. Also connected to CPU 12 are keyboard and display 16 and printer 18. Keyboard and display 16 will be described more fully below and printer 18 is preferably a thermal dot matrix printer capable of printing 40 columns of 5 by 7 matrices.

Those skilled in the art will recognize that each of the above components is a well-known commercially available item available from numerous sources and that their connection to and control by CPU 12 represents well understood techniques. Further description of the connections between these components is not believed necessary to an understanding of the subject invention and will not be given here.

Also connected to CPU 12 is electronic postage meter 30, which may be a model 6500 Electronic Postage Meter, marketed by Pitney Bowes Inc. of Stamford, Conn. Such meters are devices which imprint indicia representative of a pre-selected postage amount and which account for postage expended in this manner. Typically, the accounting system of such a meter will include an ascending register which is initially set to zero and is incremented to reflect total postage expended by the meter, and a descending register which is initially set to a pre-selected amount and is decremented to reflect the postage values remaining in the meter.

Typically, such meters are provided with a communications port for control by an external device such as system 10. However, because such meters are, in effect, machines for spending money they are preferably controlled through special, low error, secure interfaces. Such an interface is disclosed in U.S. Pat. No. 4,301,507, For: Electronic Postage Meter Having Plural Computing System, By: Soderberg et al, Issued: Nov. 17, 1981, the teachings of which are hereby incorporated by reference.

In the system of FIG. 1, meter 30 is connected to CPU 12 by meter interface 22.

Optionally, postal scale 40 may also be connected to CPU 12 through scale interface 24. Postal scales are well known devices for computing postal charges in accordance with the weight of an item as well other information entered by an operator and postal scale 40 would provide postal charges as well as such other information as item weight, destination zone, etc., to CPU 12. As will be apparent from the description set forth below, inclusion of postal scale 40 will simply provide an alternative way to enter postal information into system 10 and will not substantially affect the operation of system 10 in its basic accounting function.

Figure 2:
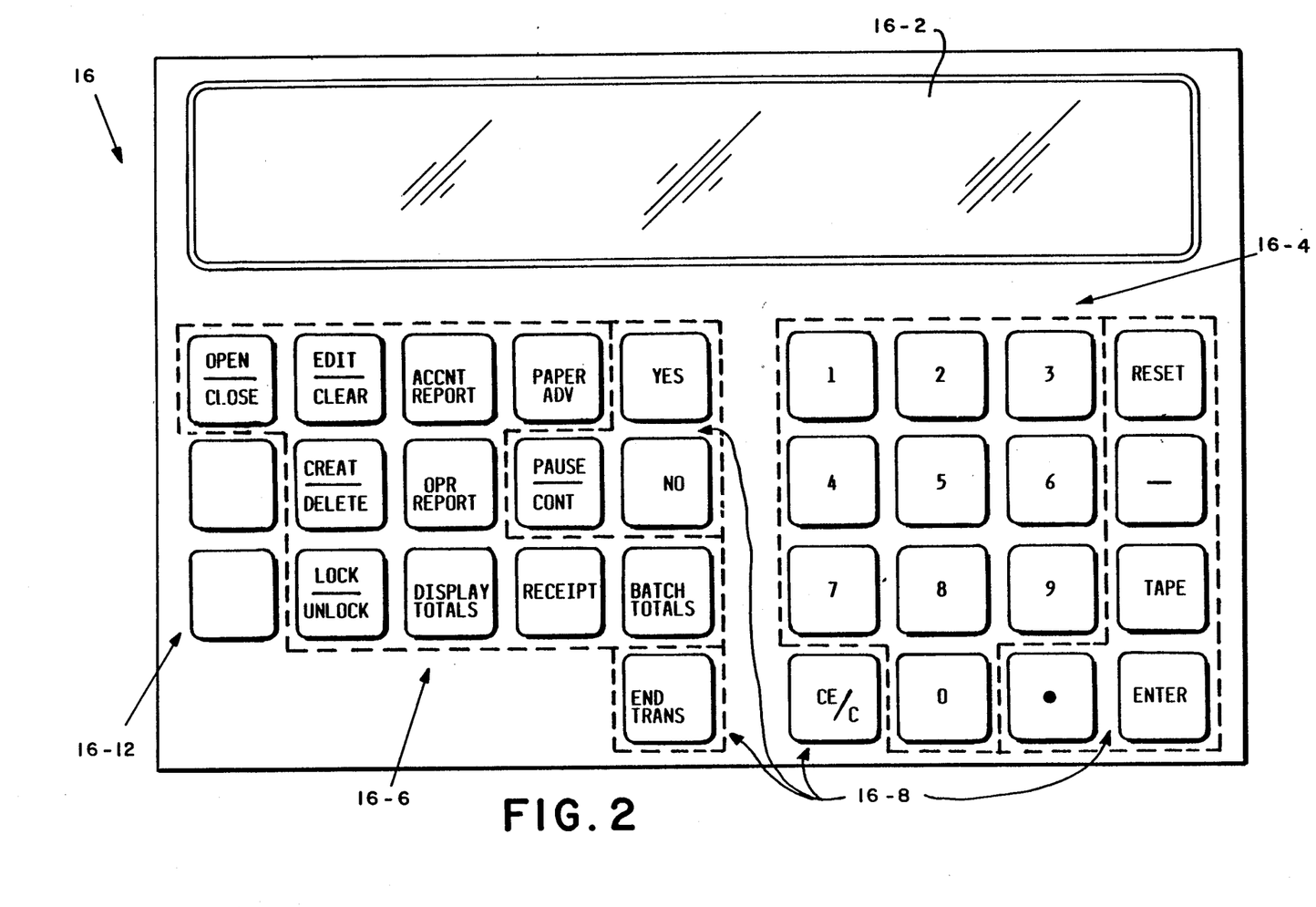
FIG. 2 shows a plan view of a keyboard and displayed used in an embodiment of the subject invention.

FIG. 2 shows keyboard and display 16. Keyboard and display 16 includes a display 16-2 which may be any of several commercially available forms of alphanumeric display but is preferably a 16 character, 14 segment fluorescent tube display having full alphanumeric capabilities. Keyboard and display 16 also includes numeric keypad 6-4 function keys 16-6 and control keys 16-8. Keyboard and display 16 also includes two unlabeled keys 16-12 which may be used for additional or special functions as will be described more fully below.

Numeric keypad 16-4 and control keys 16-8 are used by an operator to control the sequence of various transactions initiated through function keys 16-6. More particularly, numeric keypad 16-4 and function keys 16-8 operate as follows.

0-9—10 numeric keys comprising keypad 16-4 and used to specify numeric values such as account number, postage value, class, account, etc.

".''—used as a delimiter between dollars and cents.

"-''—Hyphen/minus, used as a hyphen within an account number and as a minus sign when editing account data.

RESET—Reset, used to exit the current function and return to the initial state.

CE/C—Clear Entry, used to clear the currently displayed value. A second depression causes the system to return to the last displayed prompt.

END TRANS—End Transaction used to signal the end of processing of a batch of mail.

ENTER—Enter, used to enter the displayed value into the system and to signal the meter to operate in letter mode.

TAPE—Tape, used to signal tape mode to the meter.

YES—Yes, used to signal a yes response to a prompt.

NO—No, signal used to signal a no response to a prompt.

PAPERFEED—Paperfeed, used to advance the printer paper.

PAUSE/CONT—Pause/Continue, used to stop or start printing and to cycle through displays of values by the system.

Function keys 16-6 each initiate a particular transaction with the system. Each of these transactions is defined more particularly below.

OPEN/CLOSE—This transaction will open a system for use or close it so that it may not be used. When the system is opened, the operator will be able to establish various system parameters such as date and time, station I.D., whether or not to print accounts having a zero balance, whether or not other transactions should require a class of mail input, and whether or not to update the account base. Preferably, opening the system will require input of an operator access code to identify the operator and changes in any system parameters, other than the date and time, will require entry of a supervisor's password.

CREATE/DELETE—The Create/Delete transactions allows the operator to create or delete accounts in the account data base and to define the various classes of mail which may be included in each account. The operator may arbitrarily define the account number for each account created. Preferably, the Create/Delete transaction requires the input of a supervisor's password.

LOCK/UNLOCK—The Lock/Unlock transaction allows the operator to lock specified accounts so that they may not be used or to unlock previously locked accounts. Preferably, the Lock/Unlock transaction requires entry of a supervisor's password code.

BATCH TOTALS—The Batch Totals transaction is used in the course of a meter transaction (described below) to display the total postage value dispensed and the total number of pieces for a batch of mail on display 16-2.

DISPLAY TOTALS—The Display Totals transaction is used by an operator to display the total amount of postage dispensed and the total number of pieces by account and class (if the class option has been selected during the open transaction).

RECEIPT—The Receipt transaction is used by an operator at any time to determine whether or not a receipt will be issued for subsequent transactions.

PAPER ADV—The Paper Advance transaction is used to advance the paper in printer 18.

OPR REPORT—The Operator Report transaction is used by the operator to print out summary reports of the meter status including ascending and descending registers, piece count, etc.; station summary including total piece count and value for each class of mail; and account status for each account and class in the account data base, showing the edited, zero balance, locked and check sum status for each account and class (if the class option has been selected during set up) in the account data base.

ACCNT REPORT—The Account Report transaction is used by the operator to generate reports for the entire account data base or for selected accounts. This function will be described more fully below.

EDIT/CLEAR—The Edit/Clear transaction is used by the operator to edit or clear selected accounts. Preferably, this transaction requires entry of a supervisor's password code. This transaction will be described more fully below.

METER TRANSACTION—The Meter Transaction is used by the operator to set up the meter or a batch of mail and to account for postage expended in processing that batch. It is the default transaction of the system and is initiated on power-up or by the Reset command. The Meter Transaction will be described more fully below.

Each of the above described transactions, other than those to be more fully described below, represents a routine data processing function easily implemented by any person skilled in the art. These transaction have been described in order to provide a complete description of the features of the preferred embodiment but do not form limitations on the subject invention. Accordingly, a further description of these features is not believed necessary to an understanding of the subject invention and will not be given herein.

TABLE 1

| ACCOUNT RECORD DATA FIELD | | |
|---|---|---|
| | # Characters | # Bytes |
| Data | | |
| Account Number | 8 (XXXXXXXX) | 4 |
| Mail Type | 1 (X) | 1 |
| Piece Count | 6 (XXXXXX) | 3 |
| Postage Costs | 8 (XXXXX.XXX) | 4 |
| Other | | |
| Check Sum | | 1 |
| Locked/Unlocked Status | ⎫ | 1 |
| Edited Account Status | ⎬ | |
| Check Sum Error | ⎭ Total Bytes Required | 14 |

Table 1 shows an exemplary account record in accordance with the subject invention. The record includes an 8 character Account Number stored in 4 bytes, a 1 character Class (mail type) stored in 1 byte, a 6 character Piece Count stored in 3 bytes, and an 8 character total Postage Costs, with 3 characters to the right of the decimal point, stored in 4 bytes. Additionally, there is 1 byte for a Check Sum and 1 byte containing various status flags, Locked/Unlocked Status, Edited Account Status, and Check Sum Error. In systems including a postal scale, the data field shown above would be expanded to include additional items such as weight, destination zone, etc.

As will be described further below, during a Meter Transaction the Account Record for a selected Account Number and Class are updated with the Piece Count and total Postage Costs for a batch. As will also be described further below, various reports are generated by the system by searching the Account Record data base and generating the totals required for particular transactions.

Figure 3:
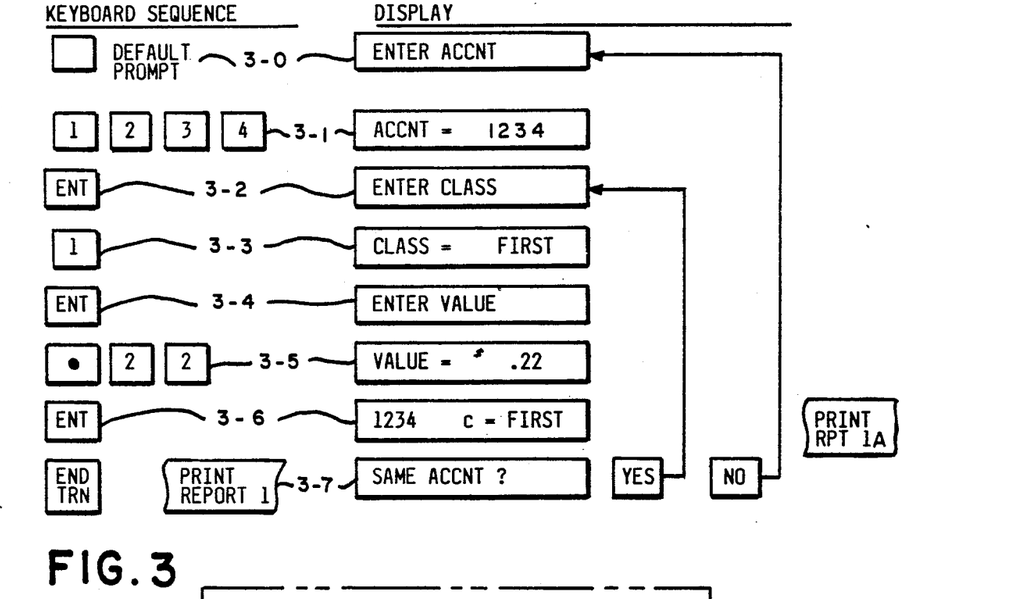
FIG. 3 is a schematic diagram of the sequence of a meter transaction by the system of the subject invention.

Turning to FIG. 3, the sequence for a Meter Transaction is shown. At step 3-2 the system is shown in the initial state after power-up or a Reset command displaying the prompt ENTER ACCNT. At step 3-1, the operator enters an account number through keypad 16-4 and the account number is displayed on display 16-2. At step 3-2 the operator may enter the Account Number with an enter command. The system then displays the prompt ENTER CLASS. At step 3-3 the operator may enter a class which is displayed on display 16-2. At step 3-4 the operator confirms the class with an ENTER command and the system displays the prompt ENTER VALUE. At step 3-5 the operator enters a dollar and cents value through keypad 16-4 and the value is displayed by the system. At step 3-6 the operator enters the value using a ENTER command and display 16-2 shows the account number and class. At this point, the system is in the letter mode and the operator may run a batch of mail. When the batch is completed, the operator signals this using the End Transaction command at step 3-7. At this point, the system will print Report 1 and display the prompt SAME ACCNT. In response to the End Transaction command, the system requests postage meter 30 to transmit the contents of its Batch Register and Piece Count register and updates the specified account by adding these values to the current totals in the specified account.

At step 3-7 the operator may either enter a Yes command returning the system to step 3-2 or a No command causing the system to print Report 1a.

It is implicit in the above description that the operator may clear mistaken entries using the CE/C command as described above and that reports may be suppressed using the Receipt command as described above.

Figure 4:
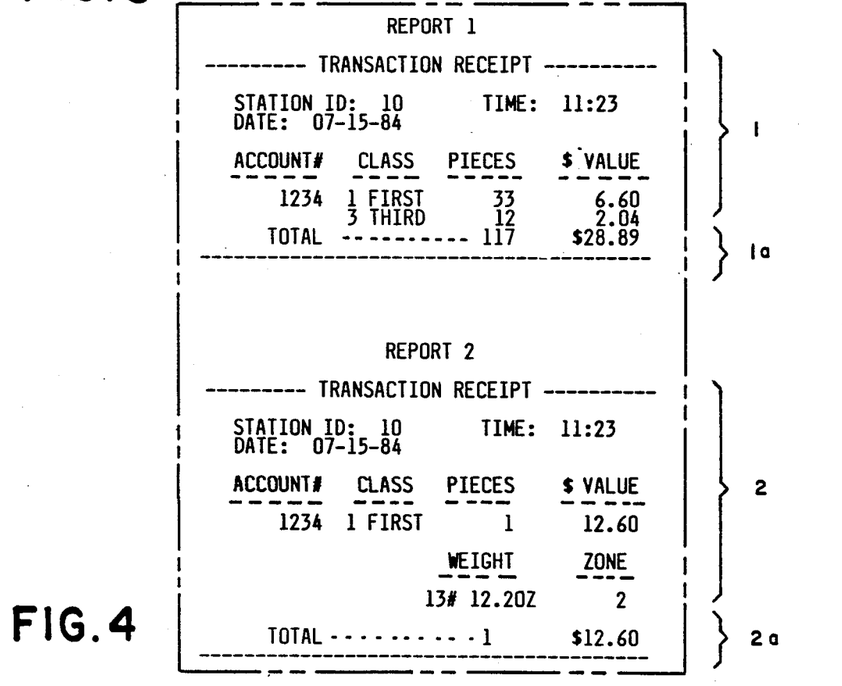
FIG. 4 shows typical reports generated by the system in a meter transaction.

FIG. 4 shows the reports printed during the Meter Transaction of FIG. 3. These reports include a header with an identifying title, the station I.D., the date and time. Report 1 shows the account number with each batch recorded by class, total pieces, and total postage expended. Report 1a is appended to the end of Report 1 when the Meter Transaction ends and shows total pieces and total postage expended for the transaction. Report 2 shown in the FIG. 2 is exemplary of a report printed by a system which includes a postal scale. Report 2 is substantially similar to Report 1 but includes additional information provided through postal scale 40 such as weight, and destination zone. This additional information however has little affect on the overall operation of the system and will not be described further herein.

At step 3-6 the operator may enter a Tape command in place of the Enter command which will cause meter 30 to generate a tape for application to a parcel or other item to be mailed. Additional Tape commands will cause additional tapes to be generated.

Figure 5:
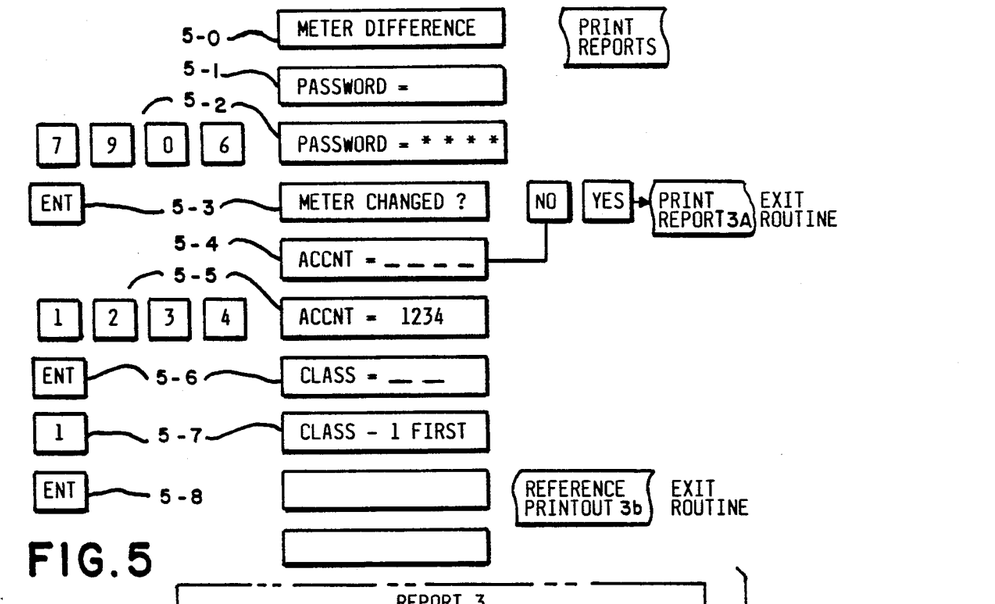
FIG. 5 shows a schematic diagram of the sequence of a meter difference transaction in the system of the subject invention.

In one preferred embodiment of the subject invention, provision is made to detect changes in meters or the use of a meter "off-line" (i.e., when not connected to the system). Such provision is shown in FIG. 5.

As noted above, meter 30 includes an Ascending register which contains the total postage expended by meter 30. In the embodiment of FIG. 5, the system requests and meter 30 transmits the contents of the Ascending register at the beginning of each Meter Transaction. The system then compares the contents of the Ascending register to previously stored contents of the Ascending register. If a difference is detected, the system displays the prompt METER DIFFERENCE and prints Report 3 at step 5-0. At step 5-1 the system displays the prompt PASSWORD, requesting a supervisory password from the operator, and at step 5-2 the operator may enter the supervisor's password code which is displayed on display 16-2. At step 5-3 the operator enters the password code and the system displays the prompt METER CHANGED. If the operator responds with a Yes command, the system prints Report 3a and exits, updating the value stored for the Ascending register to conform to the most recently transmitted value. If the operator responds with a No command, the system displays the prompt ACCNT at step 5-4. At step 5-5 the operator enters an account number and at step 5-6 enters it into the system with a Enter command. If the system was initialized during the Open Transaction to display class prompts at step 5-6, the system will display the prompt CLASS. At step 5-7 the operator may input a class and enter it into the system at step 5-8. At step 5-8 the system will exit the Meter Difference Transaction, updating the stored Ascending register value to conform to the most recently transmitted value, and print Report 3b.

Figure 6:
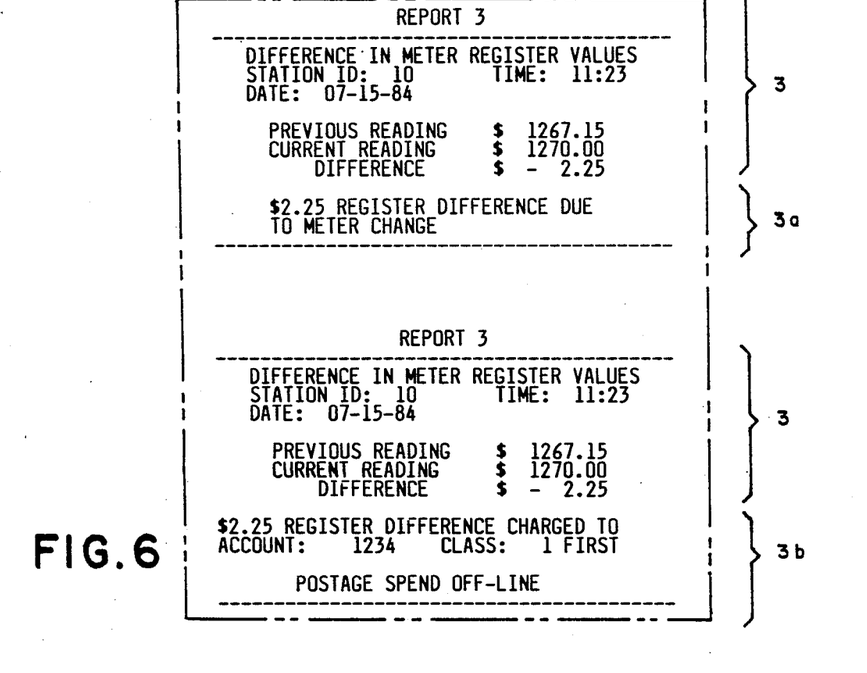
FIG. 6 shows typical reports generated in a meter difference transaction.

FIG. 6 shows various reports which may be printed during a Meter Difference Transaction. Report 3 includes an appropriate title, the standard heading, the previous reading of the Ascending register, the current reading, and the difference. If the operator has indicated at step 5-3 that meter 30 has been changed, Report 3a will be appended showing that the register difference is due to a meter change. If the operator has indicated that the meter has not been changed and entered an Account Number and, possibly, a Class Report 3b will be appended showing that the difference was due to postage expended off-line and that that difference has been charged to the selected Account and Class.

Figure 7:
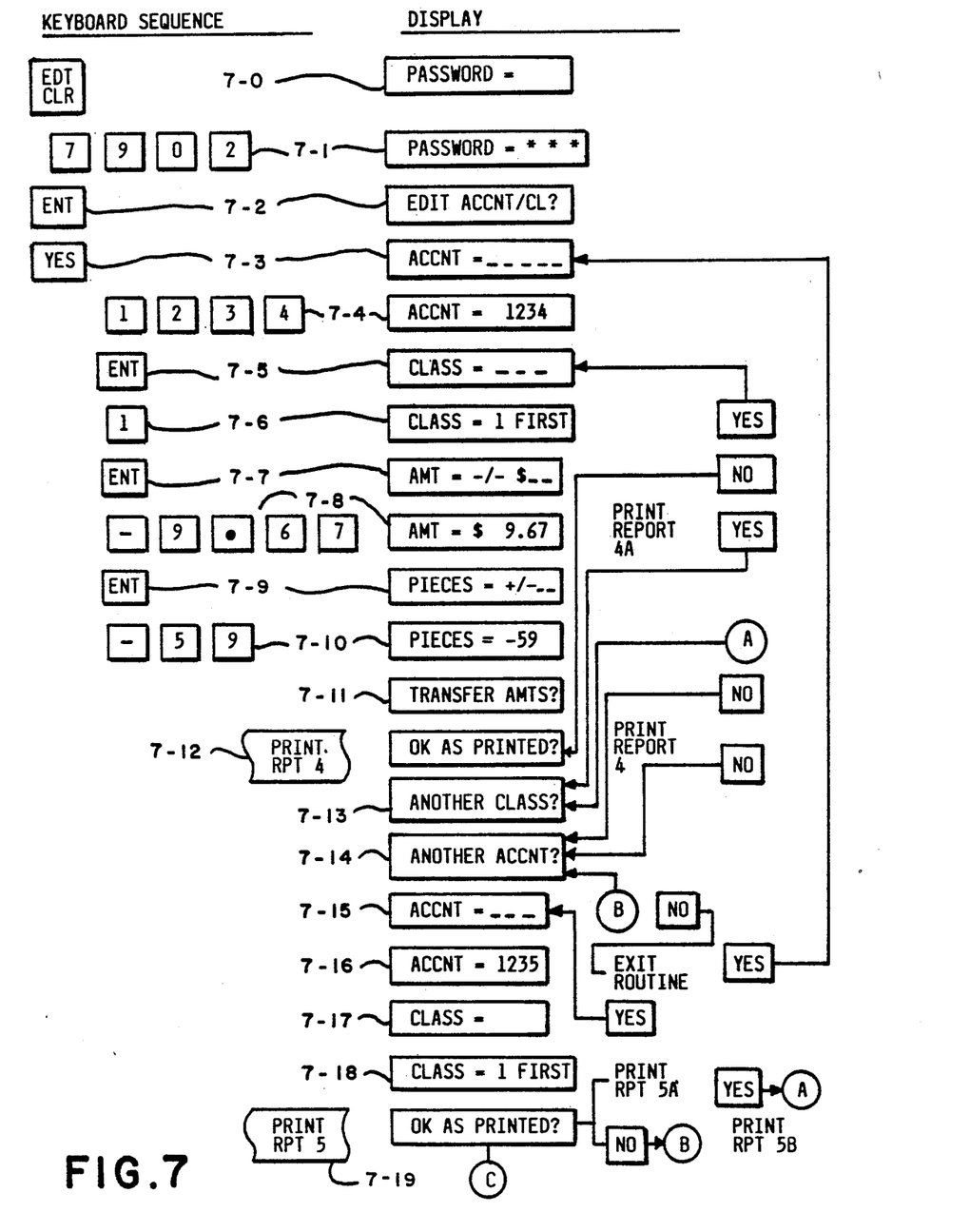
FIG. 7 shows a schematic diagram of the sequence of an edit transaction in the system of the subject invention.

FIG. 7 shows an edit transaction sequence. At step 7-0 the operator enters the edit transaction by entering an Edit/Clear command and the prompt PASSWORD is displayed. At step 7-1 the operator enters a supervisor's password code and at 7-2 enters it into the system which displays the prompt EDIT ACCNT/CL. If at step 7-3 the operator enters a Yes command, the system displays ACCNT. Steps 7-4 through 7-7 allow the operator to enter an Account Number and, possibly, Class. At step 7-7 displays 16-2 shows AMT = +/ −. At step 7-8 the operator enters a dollar amount, including a minus sign if the amount is to be subtracted. At step 7-9 the operator enters the amount into the system and display 16-2 shows the prompt PIECES = +/ −. Steps 7-9 through 7-11 allow the operator to similarly update the Piece Count. At steps 7-11 display 16-2 shows the prompt TRANSFER AMTS. If the operator enters a No command at step 7-12, the system prints Report 4 and display 16-2 shows the prompt OK AS PRINTED. If the operator enters a Yes command, display 16-2 shows the prompts ANOTHER CLASS and ANOTHER ACCNT at steps 17-13 and 17-14 respectively. A Yes command entered at either step will return the system to step 7-5 or 7-3 respectively to edit another class in the same account or another account. If the operator enters No commands at both steps, the system will exit the Edit Transaction. If at step 7-11 the operator enters a Yes command at step 7-15–7-18, the operator may enter another Account Number and, possibly, Class. The funds and/or piece count changes entered by the operator will be transferred to or from this second account and class. At step 17-19 the prompt OK AS PRINTED is displayed and Report 5 is printed. If the operator enters a Yes command, the system returns to step 7-13 to ask if another class in the same account is to be edited and prints Report 5a. If a No command is entered, the system returns to step 7-14 to ask if another account is to be edited and prints Report 5b.

Figure 8:
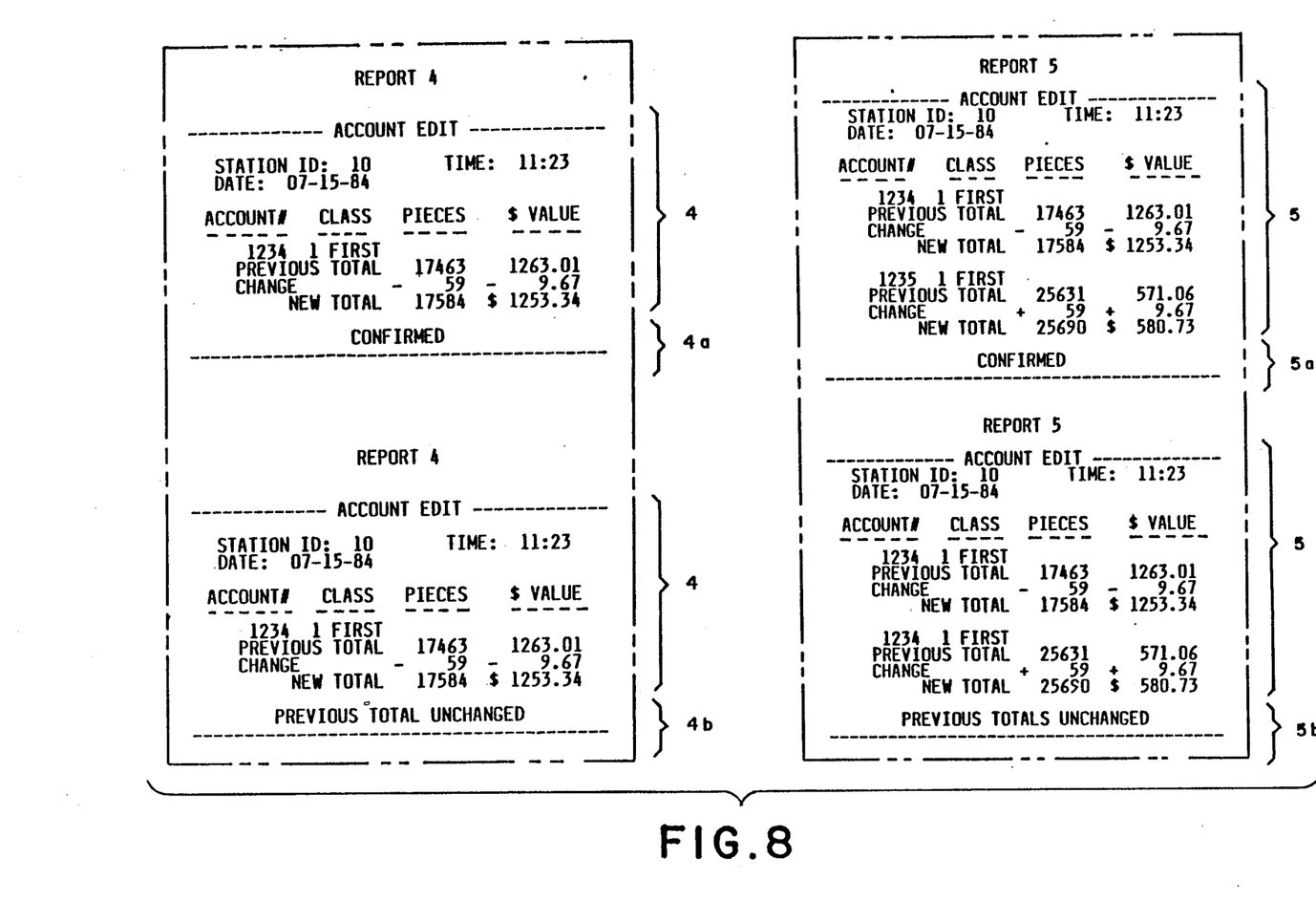
FIG. 8 shows typical reports generated by the system during an edit transaction.

FIG. 8 shows the reports printed in an edit transaction. Report 4 includes an appropriate title and the standard heading and identifies the account and, possible, class edited. The Report sets forth the previous totals for the account and class edited, the change, and the new total. Report 4a is appended to show that the editing changes have been confirmed by the operator and that the account totals have been changed. If the operator does not confirm the changes, Report 4b is appended to show that the previous totals remain unchanged. Report 5 is generated if the editing changes represent a transfer of funds from one account to another. Report 5 includes the same title and standard heading as Report 4 and the same information for both the first and second accounts and classes as provided in Report 4 with the changes in the first and second accounts being complimentary. As with Report 4, Report 5a is appended if the editing changes are confirmed by the operator and Report 5b is appended if the editing changes are not confirmed and the totals remained unchanged.

Figure 9:
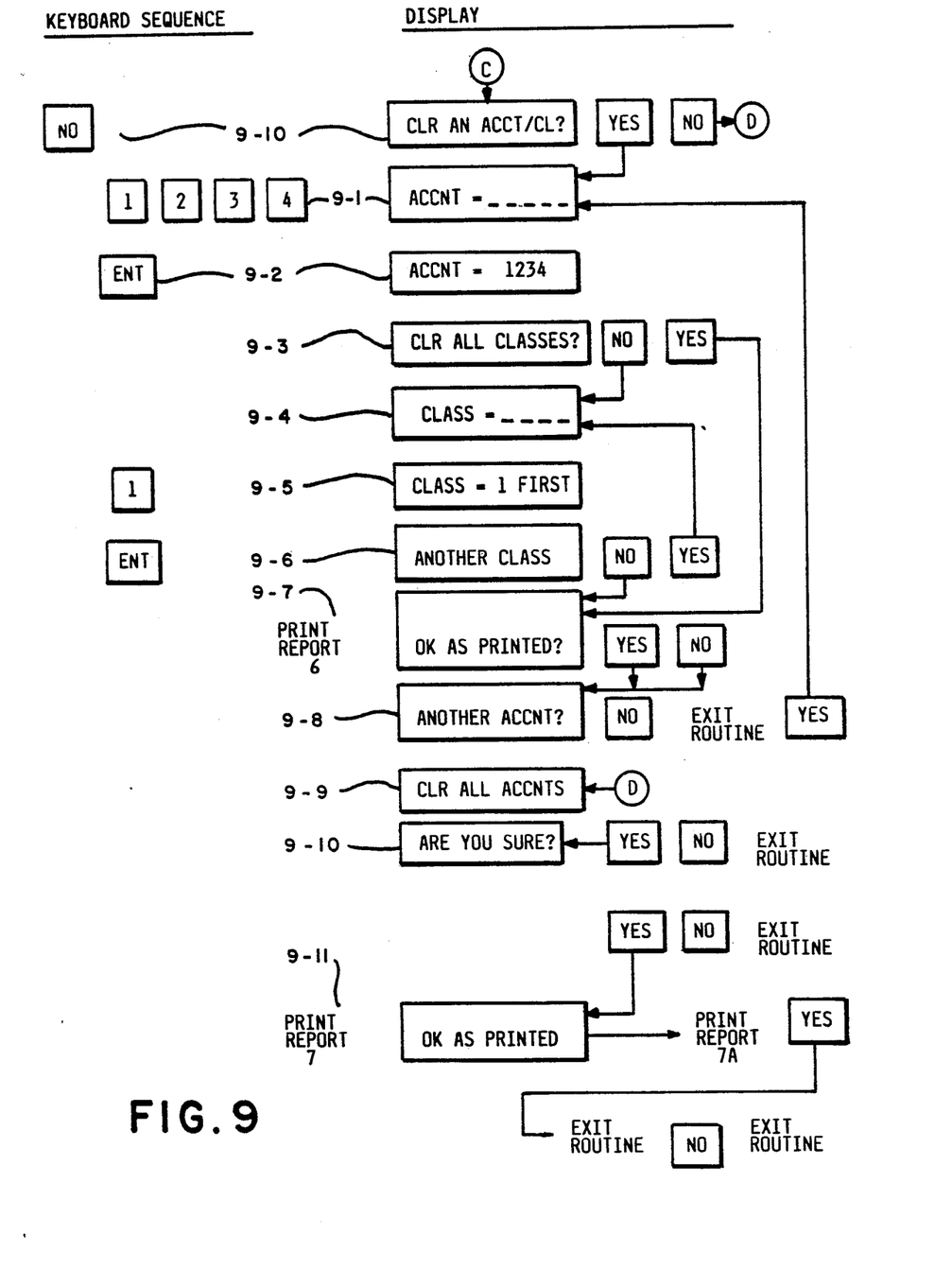
FIG. 9 shows a schematic diagram of the sequence of a clear transaction in the system of the subject invention.

FIG. 9 shows a Clear Transaction in the system. If at step 7-3 of an Edit Transaction the operator enters a No command, the system goes to step 9-0 of a Clear Transaction and display 16-2 shows the prompt CLR AND ACCNT/CL. If the operator enters a Yes command at steps 9-1 and 9-2, an Account Number is entered in the manner described above. At step 9-3 the system displays CLR ALL CLASSES. If the operator enters a No command at step 9-4, the system displays CLASS and at step 9-5 a Class is entered. At step 9-6 display 16-2 shows ANOTHER CLASS. If the operator enters a No command at step 9-7, the prompt OK AS PRINTED is displayed and Report 6 is printed. If the operator enters a Yes command, Report 6a is printed and if No command is entered, Report 6b is printed. At step 9-8 ANOTHER ACCNT is shown and if a No command is entered, the system exits the Clear Transaction, and if Yes is entered, it returns to step 9-1 to get another Account Number.

If at step 9-3 the operator enters a Yes command, the system goes to step 9-7 and displays the prompt OK AS PRINTED and prints Reports 6, 6a, or 6b as described above for all classes in that account. If at step 9-6 a Yes command is entered, the system returns to step 9-4 to get another Class. If at step 9-0 a No command is entered, the system goes directly to step 9-9 and displays the prompt CLR ALL ACCNTS. If a Yes command is entered at 9-10, the prompt ARE YOU SURE is displayed. If a second Yes command is entered, the prompt OK AS PRINTED is displayed and Report 7 is printed at step 9-11. If a third Yes command is entered, Report 7a is printed and the system exits the Clear Transaction. If a No command is entered at any of steps 9-9, 10, or 11, the system exits the Clear Transaction.

Figure 10:
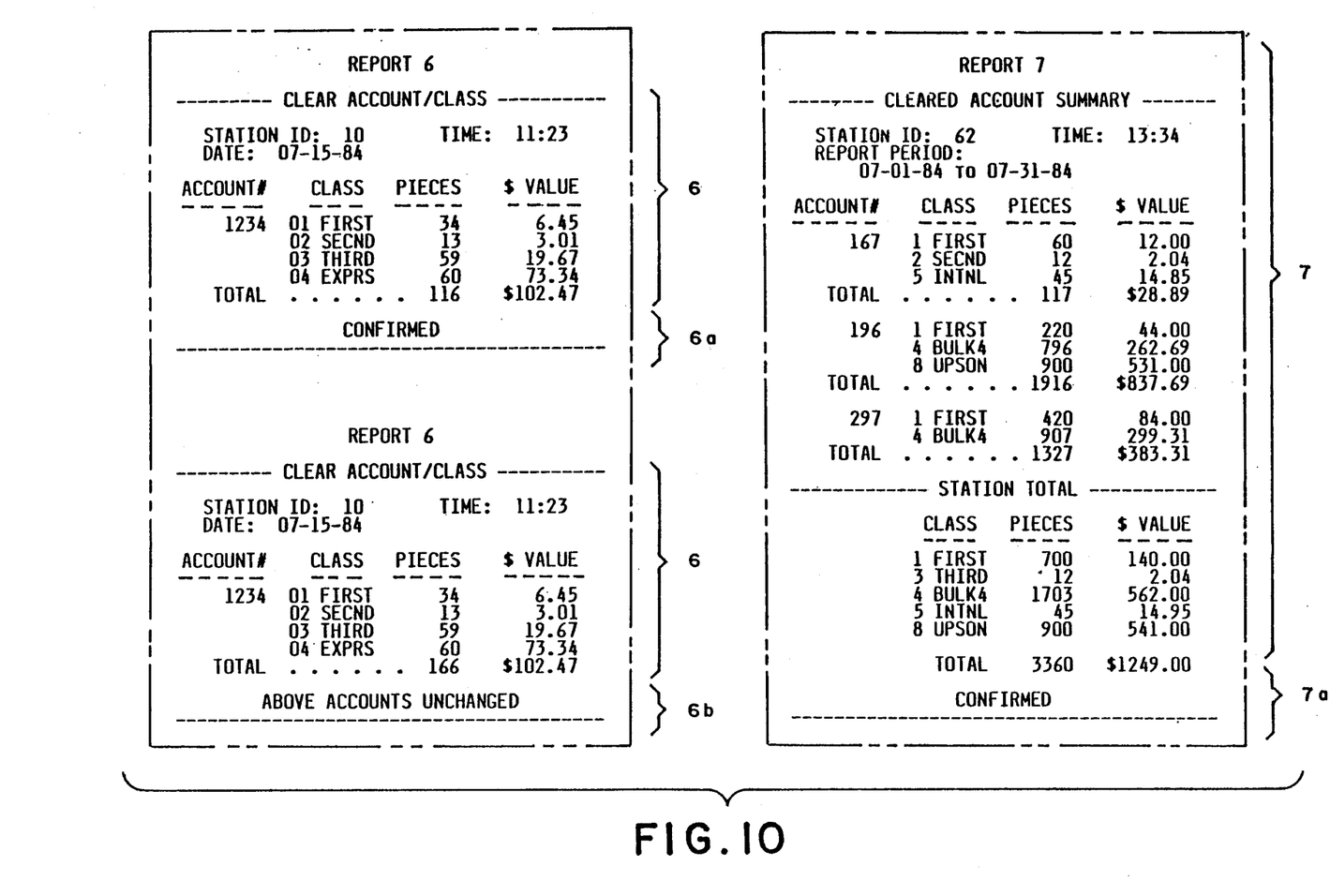
FIG. 10 shows typical reports generated by the system during a clear transaction.

FIG. 10 shows the Reports generated in a Clear Transaction. Report 6 includes an appropriate title, the standard heading and the last values by account, and class if the class option was selected during the Open Transaction, for a selected account. Report 6a is appended if the operator confirms and Report 6b is appended if the operator does not confirm the Clear Transaction.

Report 7 has the same title and header and lists the same information as Report 6 for all Accounts and the data base. In addition, Report 7 lists totals for Piece Count and Postage by Class. Report 7a is appended if the operator confirms the Clear Transaction for all Accounts and Report 7b is appended if the Transaction is not confirmed.

Figure 11:
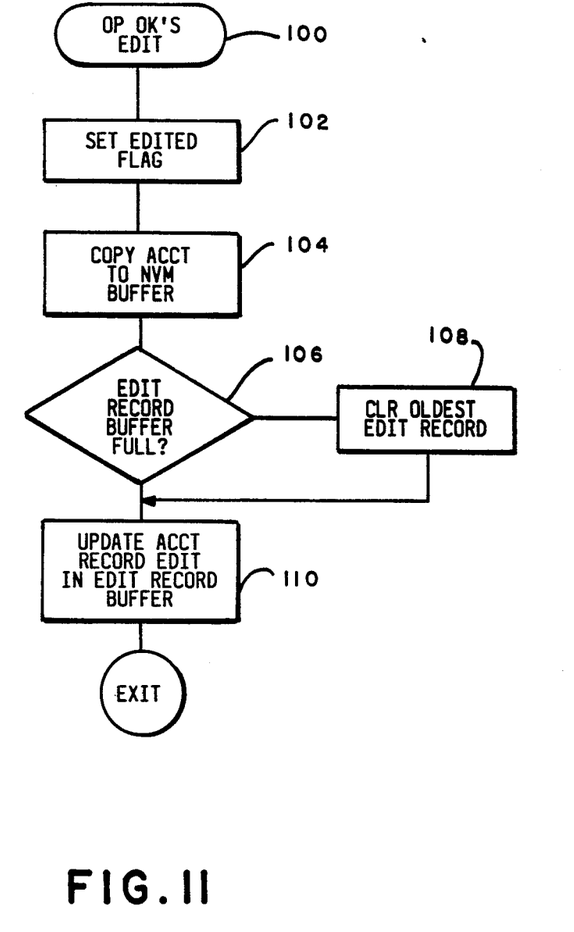
FIG. 11 shows a flow chart representation of the operation of the system of the subject invention during an edit/clear transaction.

As noted above, the Edit Transaction is a vulnerable point in the operation of the system of the subject invention. Accordingly, Accounts are edited as shown in the flow chart of FIG. 11. At 100 the program for system 10 enters the editing routine in the Edit Transaction when the operator confirms an editing change to a particular Account Record. At 102 the Edited Flag in the Account Record is set. At 104 the selected Account Record is copied to a copy buffer in non-volatile memory to protect the record of the unedited Account Record in the event of a power failure or transient occurs during updating of the Account Record. If such a power failure or transient occurs, the image stored in the copy buffer at 104 will enable an operator to restore the Account Record data base if Reports have not been generated or have been lost. At 106 system 10 tests the Edit Record Buffer which is maintained in a pre-determined region of non-volatile memory to determine if it is full. If it is full, the oldest Edit Record is purged. At 110 system 10 then records an Edit Record consisting of at least the Account Number in the Edit Record Buffer and then updates the account record, then exits to return to the Edit Transaction. As will be described more fully below, the Edit Record Buffer provides a secure record of a predetermined number of the last Edit Transactions performed on the Account Record data base. This Edit Record Buffer is helpful to service technicians in detecting inappropriate Edit Transactions by operators, as described above. This Edit Record Buffer is accessible to service technicians in the manner described below but is not intended to be accessible to operators or supervisors. Note that the Edit Record Buffer may consist only of the Account Number but also may, memory space permitting, be extended to include additional data up to a complete image of the previous Account Record. Similar records are stored in the Edit Record Buffer when accounts are created and/or deleted.

As will be discussed further below, the Edit Record Buffer is a useful supplement to the Edited Flag stored in the Account Record since it provides a record of the number and sequence of changes to the Account Record data base which is not altered by the creation and deletion of accounts.

Figure 12:
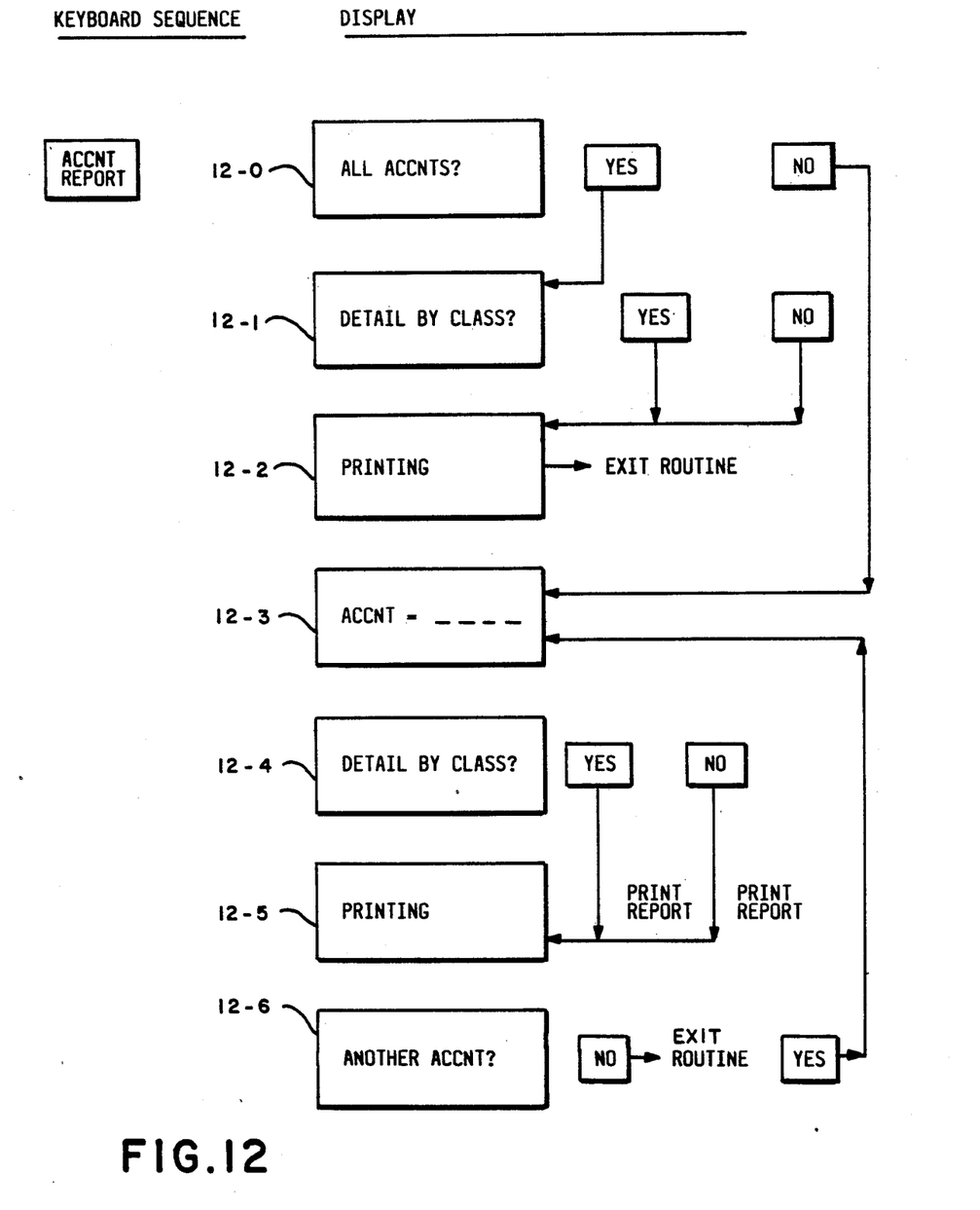
FIG. 12 shows a schematic diagram of the sequence of an account report transaction in the system of the subject invention.

FIG. 12 shows a schematic representation of a Account Report Transaction. When the operator initiates the Account Report Transaction, the system displays ALL ACCNTS. If the operator enters a Yes command at step 12-0, display 16-2 shows the prompt DETAIL BY CLASS at step 12-1. If the operator enters a second Yes command, the system displays the prompt PRINTING at step 12-2, prints Report 8 and exits the routine. A No command at 12-1 causes the system to print Report 9.

If at step 12-0 the operator enters a No command, the system goes to step 12-3 and displays the prompt ACCNT and at steps 12-4 and 12-5 an account number is entered in the manner described above. At step 12-5 the system displays the prompt DETAIL BY CLASS again, and Report 10 or 11 is printed in response to a Yes or No command respectfully at step 12-6. At step 12-7 the prompt ANOTHER ACCNT allows the operator to either exit with a No command or return to step 12-3 to print another Account Report.

Figure 13:
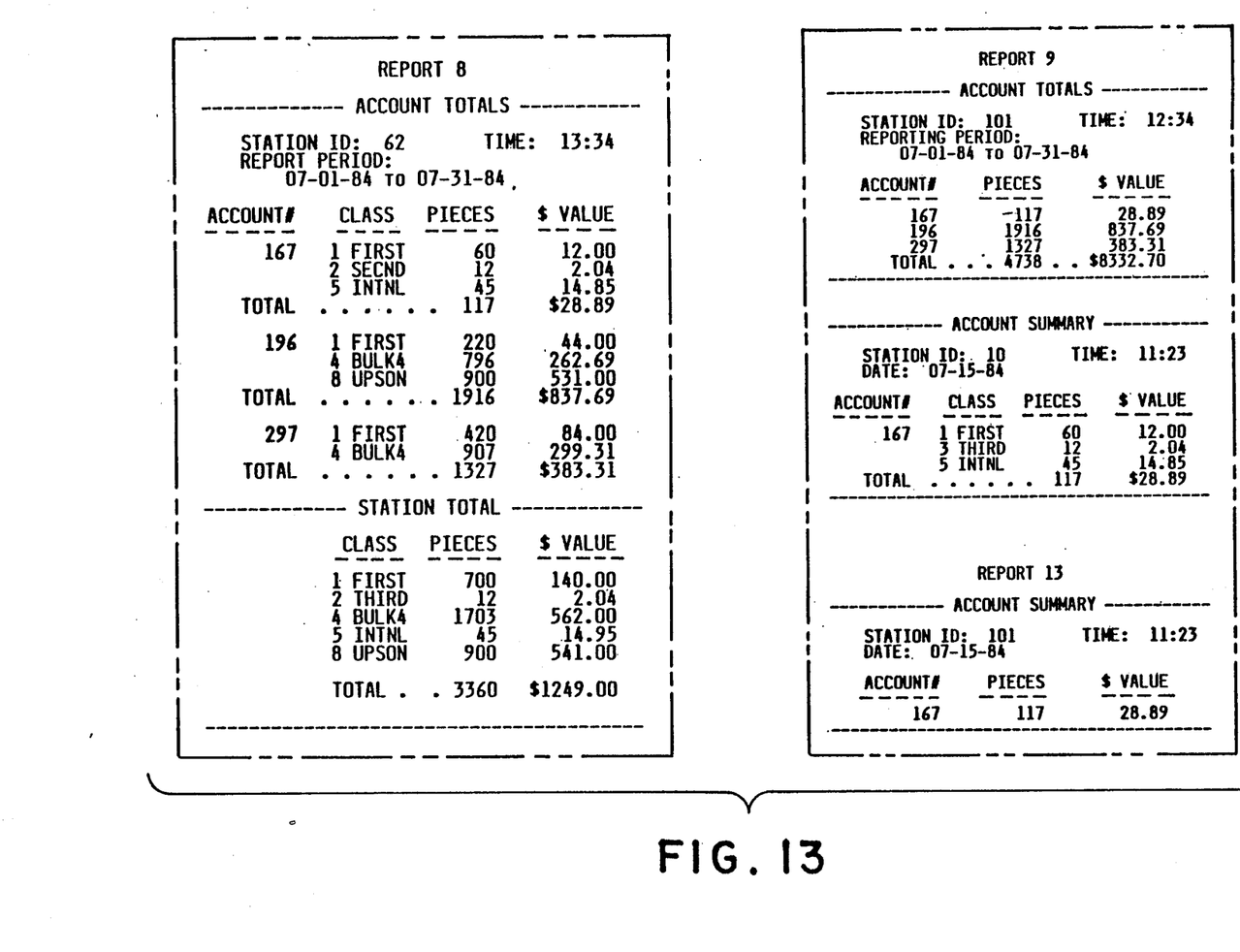
FIG. 13 shows typical reports generated by the system during an account report transaction.

FIG. 13 shows the reports generated during an Account Report Transaction. Report 8 includes an appropriate title and the standard heading as well as the dates of the reporting period. The report gives the total Piece Count and Postage Expended for each Account, and for each Account broken down by Class. Report 8 also includes a Station Total which gives the total Piece Count and Postage Expended for the station during the reporting period and breaks this total down by Class.

Report 9 provides the same information as Report 8 without the Class breakdown and Report 10 provides the same information as Report 8 for a specified Account Number. Report 11 provides the same information as Report 10 again, without the Class breakdown.

As noted above, the Applicants have realized that when the entire Account Record data base is printed in Account Number order, system 10 is particularly vulnerable to power failures or transients during sort routines which place the data base in Account Number order. Accordingly, printing of the data base is carried out in accordance with the flow chart of FIG. 14 without sorting the data base.

Figure 14:
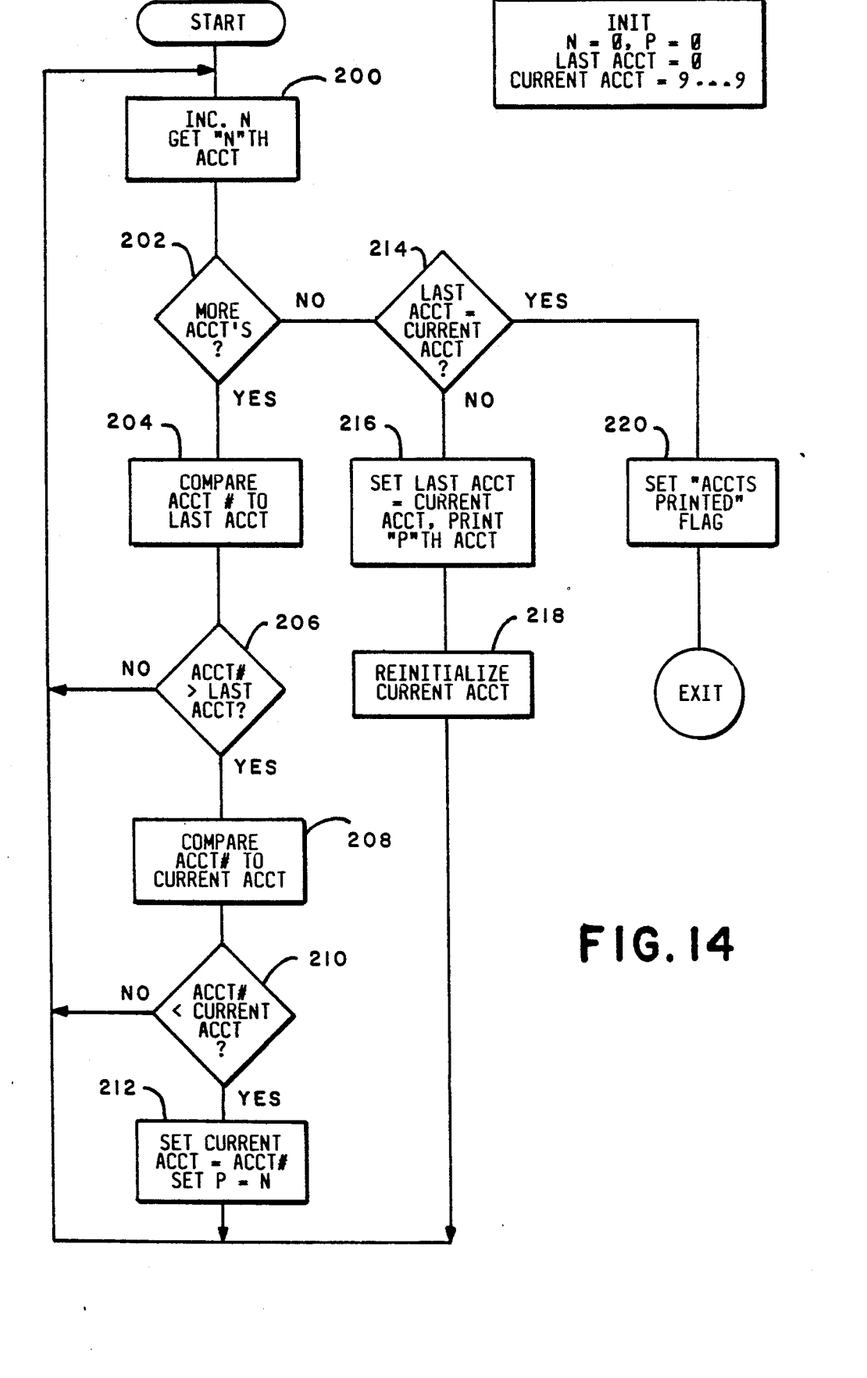
FIG. 14 shows a flow chart representation of the operation of the system of the subject invention in printing out an account report transaction.

Initially, N=0, P=0, a register LAST ACCT=0, and a second register CURRENT ACCT=9...9.

At 200 system 10 increment N and gets the "N"th Account in the sequence of Accounts stored in the data base. At 202 system 10 tests to see if there are more accounts in the data base. If there are at 204, it compares the Account Number to the contents of LAST ACCT. At 206 it compares the Account Number of the "N"th Account to the LAST ACCT. If the Account Number is greater than LAST ACCT at 208, system 10 compares the Account Number to the CURRENT ACCT. If the Account Number is less than the CURRENT ACCT at 210, then the system sets CURRENT ACCT equal to the Account Number and sets P equal to N and returns to 200 to get the next account in sequence in the data base. If either of the tests at 206 or 210 are failed, system 10 returns immediately to 200. At 202 when all accounts have been tested, system 10 goes to 214 and tests if LAST ACCT is equal to CURRENT ACCT. If it is not, system 10 sets the LAST ACCT equal to CURRENT ACCT, and prints the "P"th Account, reinitializes the CURRENT ACCT, at 218, and returns to 200. If the LAST ACCT is equal to the CURRENT ACCT, system 10 sets the Accounts Printed Flag at 220 and exits.

As can be seen, the procedure of FIG. 14 avoids the need for rewriting of Accounts in the data base and minimizes the risk from power failures or transients.

As noted above, a service technician may use the Edit Record Buffer in cases where a claim is made that system 10 is not properly accounting. By setting a mode switch (not shown) from the operate to the service mode, then pressing one of unmarked keys 16-12 and, in response to a prompt, entering a service code, known only to the service technician, a printout of the Edit Record Buffer may be obtained. If this record shows that accounts in question have been altered, the technician may then reasonably expect the supervisor to provide the printout of the alteration.

The descriptions of preferred embodiments set forth above and shown in the attached drawings have been provided by way of illustration only and these skilled in the art will recognize numerous other embodiments within the scope of the subject invention. Accordingly limitations on the scope of the subject invention are to be found only in the claims set forth below.

What is claimed is:

1. A system for accounting for the costs of postage expended by a postage meter, comprising:
   (a) data entry means for entry by an operator of commands and information, said information including postal information, said postal information including account numbers;
   (b) a printer;
   (c) a memory for storing program data and account records, said account records each corresponding to one of said account numbers, said memory further comprising a non-volatile memory for storing said account records;
   (d) interface means for interfacing to said postage meter;
   (e) processing means further comprising a CPU connected to said data entry means, said memory, said printer, and said interface, and responsive to said program data for:
      (e1) responding to entry of an item of said postal information corresponding to a particular batch of mail to transmit signals through said interface to set said postage meter to print indicia indicative of a selected postage amount, and responding to signals received through said interface specifying postage expended on said particular batch of mail to update one of said account records corresponding to one of said account numbers specified by said item to account for said postage expended;
      (e2) responding to entry of a report command to print said account records in account number order on said printer by scanning all said account records, determining the next account record, in account number sequence, which has not been printed, and printing said determined account record; and,
      (e3) repeating the procedure of (e2) until all said account records are printed.

2. A system as described in claim 1 wherein said processing means is further responsive to a create command for:
   (a) receiving information defining an account record, said defining information including a corresponding arbitrary account number; and,
   (b) creating an initial account record corresponding to said included corresponding account number in said non-volatile memory;
   (c) whereby a sequence of account records may be created in arbitrary order and printed in account number order without need for sorting and the concomittant exposure to power failures or transients while said account records are being rewritten into said memory.

3. A system as described in claim 2 further comprising a display means responsive to said processing means for display of prompts and other information to an operator, and wherein said processing means is further responsive to said report command for:
   (a) initially displaying a first prompt;
   (b) in response to a first selection command printing all said account records in account number order;
   (c) alternatively, in response to a second selection command displaying a second prompt requesting input of a selected one of said account numbers; and
   (d) in response to input of said selected account number imprinting one of said account records corresponding to said selected account number.

4. A system as described in claim 2 wherein said account records include the total amount of postage and number of pieces charged to that account, and wherein said totals are subtotaled for a plurality of classes preselected for each of said account records, and wherein further said processing means is further responsive to said report command for:

(a) displaying a detail by class prompt before printing any of said account records;

(b) in response to a first selection command printing said account records including said subtotals; and, (c) alternatively, in response to a second selection command printing said account records without including said subtotals.

5. A system as described in claim 2 wherein said postage meter is an electronic postage meter.

6. A system as described in claim 2 wherein said data entry means comprises a postal scale.

7. A system as described in claim 1 further comprising a display means responsive to said processing means for display of prompts and other information to an operator, and wherein said processing means is further responsive to said report command for:

(a) initially displaying a first prompt;

(b) in response to a first selection command printing all said account records in account number order;

(c) alternatively, in response to a second selection command displaying a second prompt requesting input of a selected one of said account numbers; and (d) in response to input of said selected account number imprinting one of said account records corresponding to said selected account number.

8. A system as described in claim 7 wherein said account records include the total amount of postage and number of pieces charged to that account, and wherein said totals are subtotaled for a plurality of classes preselected for each of said account records, and wherein further said processing means is further responsive to said report command for:

(a) displaying a detail by class prompt before printing any of said account records;

(b) in response to a first selection command printing said account records including said subtotals; and, (c) alternatively, in response to a second selection command printing said account records without including said subtotals.

9. A system as described in claim 1 wherein said account records include the total amount of postage and number pieces charged to that account, and wherein said totals are subtotaled for a plurality of classes preselected for each of said account records, and wherein further said processing means is further responsive to said report command for:

(a) displaying a detail by class prompt before printing any of said account records;

(b) in response to a first selection command printing said account records including said subtotals; and, (c) alternatively, in response to a second selection command printing said account records without including said subtotals.

10. A system as described in claim 1 wherein said postage meter is an electronic postage meter.

11. A system as described in claim 1 wherein said data entry means comprises a postal scale.

12. A postage metering and accounting system comprising:

(a) data entry means for entry by an operator of commands and information, said information including postal information, said postal information including account numbers;

(b) a printer;

(c) a memory for storing program data and account records, said account records each corresponding to one of said account numbers, said memory further comprising a non-volatile memory for storing said account records;

(d) interface means for interfacing to a postage meter, said postage meter being connected to said interface means;

(e) processing means further comprising a CPU connected to said data entry means, said memory, said printer, and said interface, and responsive to said program data for:

(e1) responding to entry of an item of said postal information corresponding to a particular batch of mail to transmit signals through said interface to set said postage meter to print indicia indicative of a selected postage amount, and responding to signals received through said interface specifying postage expended on said particular batch of mail to update one of said account records corresponding to one of said account numbers specified by said item to account for said postage expended;

(e2) responding to entry of a report command to print said account records in account number order on said printer by scanning all said account records, determining the next account record, in account number sequence, which has not been printed, and printing said determined account recorded; and, (e3) repeating the procedure of (e2) until all said account records are printed.

13. A system as described in claim 12 wherein said processing means is further responsive to a create command for:

(a) receiving information defining an account record, said defining information including a corresponding arbitrary account number; and, (b) creating an initial account record corresponding to said included corresponding account number in said non-volatile memory;

(c) whereby of account records may be created in arbitrary order and printed in account number order without need for sorting and the concomittant exposure to power failures or transients while said account records are being rewritten into said memory.

14. A system as described in claim 13 wherein said data entry means further comprises a postal scale.

15. A system as described in claim 12 wherein said data entry means further comprises a postal scale.

* * * * *